(12) United States Patent
Challa et al.

(10) Patent No.: US 10,326,509 B2
(45) Date of Patent: Jun. 18, 2019

(54) LINK BUDGET ENHANCEMENTS FOR SINGLE RECEIVER DEVICES

(71) Applicant: QUALCOMM Incorporated, San Diego, CA (US)

(72) Inventors: Raghu Narayan Challa, San Diego, CA (US); Messay Amerga, San Diego, CA (US); Brian Clarke Banister, San Diego, CA (US); Alexei Yurievitch Gorokhov, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 15/158,190

(22) Filed: May 18, 2016

(65) Prior Publication Data

US 2016/0352405 A1    Dec. 1, 2016

Related U.S. Application Data

(60) Provisional application No. 62/167,877, filed on May 28, 2015.

(51) Int. Cl.
*H04B 7/06* (2006.01)
*H04W 8/24* (2009.01)
(Continued)

(52) U.S. Cl.
CPC ............. *H04B 7/0632* (2013.01); *H04L 1/08* (2013.01); *H04L 5/0064* (2013.01); *H04W 8/24* (2013.01);
(Continued)

(58) Field of Classification Search
None
See application file for complete search history.

(56) References Cited

U.S. PATENT DOCUMENTS 8,606,257 B2    12/2013  Li
8,824,598 B2    9/2014   Dimou et al.
(Continued)

OTHER PUBLICATIONS

Bergman J., "LTE Evolution for Cellular IoT", Apr. 10, 2014 (Apr. 10, 2014), pp. 1-13, XP055290783, Retrieved from the Internet: URL:http://4g-portal.com/lte-evolution-for-cellular-internet-of-things [retrieved on Jul. 22, 2016].
(Continued)

*Primary Examiner* — Rebecca E Song
(74) *Attorney, Agent, or Firm* — Dalei Dong; Patterson & Sheridan

(57) ABSTRACT

Aspects of the present disclosure provide apparatus and techniques that may be applied in systems that may help enable efficient communication between a base station (BS) and certain devices, such as wearable devices and/or machine type communication (MTC) user equipments (UEs), having a single receiver (RX) for long term evolution (LTE). An exemplary method, performed by a BS, generally includes receiving, from a UE, an indication of a category of the UE, wherein the category of the UE indicates at least one of: a maximum throughput supported by the UE or a number of layers supported by the UE; assuming a number of receivers at the UE based on the category of the UE; determining one or more transmit parameters based on the number of receivers of the UE; and communicating with the UE according to the one or more transmit parameters.

23 Claims, 8 Drawing Sheets

(51) Int. Cl.
    H04W 52/42 (2009.01)
    H04L 1/08 (2006.01)
    H04L 5/00 (2006.01)
    H04W 52/28 (2009.01)
    H04W 88/06 (2009.01)
    H04B 7/0413 (2017.01)
    H04B 1/3827 (2015.01)
    H04W 84/04 (2009.01)
    H04W 4/70 (2018.01)
    H04W 28/18 (2009.01)
    H04W 72/04 (2009.01)

(52) U.S. Cl.
    CPC .......... H04W 52/28 (2013.01); H04W 52/42 (2013.01); H04B 1/385 (2013.01); H04B 7/0413 (2013.01); H04L 5/0023 (2013.01); H04L 5/0044 (2013.01); H04L 5/0053 (2013.01); H04L 5/0091 (2013.01); H04W 4/70 (2018.02); H04W 28/18 (2013.01); H04W 72/048 (2013.01); H04W 84/042 (2013.01); H04W 88/06 (2013.01)

(56) References Cited

U.S. PATENT DOCUMENTS

| | | | |
|---|---|---|---|
| 9,078,163 B2 | 7/2015 | Kim et al. | |
| 2008/0298387 A1* | 12/2008 | Lohr | H04L 1/1671 370/467 |
| 2011/0305161 A1* | 12/2011 | Ekpenyong | H04L 1/0031 370/252 |
| 2012/0014349 A1* | 1/2012 | Chung | H04B 7/0684 370/329 |
| 2013/0242787 A1* | 9/2013 | Sun | H04W 24/10 370/252 |
| 2014/0369308 A1 | 12/2014 | Gerstenberger et al. | |
| 2014/0370905 A1 | 12/2014 | Kim et al. | |
| 2015/0139168 A1* | 5/2015 | Zhi | H04L 1/1822 370/329 |
| 2015/0365914 A1* | 12/2015 | Yu | H04W 68/02 455/458 |
| 2016/0094358 A1* | 3/2016 | Won | H04L 12/1881 370/230 |
| 2016/0278103 A1* | 9/2016 | Kazmi | H04L 5/0073 |
| 2017/0063513 A1* | 3/2017 | Nammi | H04L 5/0073 |

OTHER PUBLICATIONS

NSN., et al., "Necessity on Category 0 Indication to Network Before UE Capability Delivery", 3GPP Draft; R2-142474 (Low Cost Capability Indication), 3rd Generation Partnership Project (3GPP), Mobile Competence Centre; 650, Route Des Lucioles ; F-06921 Sophia-Antipolis Cedex, France, vol. RAN WG2, No. Seoul, Korea; May 19, 2014-May 23, 2014 May 18, 2014 (May 18, 2014), XP050793600, Retrieved from the Internet: URL:http://www.3gpp.org/ftp/Meetings_3GPP_SYNC/RAN2/Docs/ [retrieved on May 18, 2014].

Partial International Search Report—PCT/US2016/033333—ISA/EPO—dated Aug. 3, 2016.

International Search Report and Written Opinion—PCT/US2016/033333—ISA/EPO—dated Nov. 28, 2016.

NEC: "Impact Analysis of eNB not Knowing a Category 0 UE with 1 RX Antenna", 3GPP Draft; R1-142166 Impact Analysis of ENB not knowing a Category 0 UE with 1 RX Antenna-CLN-FNL, 3rd generation partnership project (3GPP), Mobile Competence Centre; 650, Route Des Lucioles; F-06, vol. RAN WG1, no. Seoul, Korea; May 1, 2014-May 23, 2014, May 18, 2014 (May 18, 2014), pp. 1-6, XP050787763, Retrieved from the Internet: URL: http://www.3gpp.org/ftp/Meetings_3GPP_SYNC/RAN1/Docs/ [retrieved on May 18, 2014].

Salzer T., et al., "Introduction and Background" In: "LTE-The UMTS Long Term Evolution From Theory to Practice", Jul. 20, 2011 (Jul. 20, 2011), XP055290784, pp. 1-22, pp. 17-18.

* cited by examiner

LINK BUDGET ENHANCEMENTS FOR SINGLE RECEIVER DEVICES

CROSS-REFERENCE TO RELATED APPLICATION & PRIORITY CLAIM

This application claims benefit of and priority to U.S. Provisional Patent Application Ser. No. 62/167,877, filed May 28, 2015, which is herein incorporated by reference in its entirety for all applicable purposes.

BACKGROUND

Field of the Disclosure

Certain aspects of the present disclosure generally relate to wireless communications and, more particularly, to link budget enhancements for single receiver (RX) devices, such as user equipments (UEs), for example, in long term evolution (LTE).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered "wearables". Wearables may include wireless devices that may be worn by the user. Wearables may have power and area constraints. Certain UEs, such as MTC UEs and wearables may have only a single RX chain.

To enhance coverage of certain devices, such as MTC devices with infrequent communications and wearables with limited power and area, techniques for link budget enhancements are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide techniques and apparatus for link budget enhancements for certain devices, such as machine type communication (MTC) user equipments (UEs) and/or wearable devices, having a single receiver (RX), for example, for long term evolution (LTE).

Certain aspects of the present disclosure provide a method for wireless communications by a base station (BS). The method generally includes receiving, from a UE, an indication of a category of the UE, wherein the category of the UE indicates at least one of: a maximum throughput supported by the UE or a number of layers supported by the UE, assuming a number of receivers at the UE based on the category of the UE, determining one or more transmit parameters based on the number of receivers of the UE, and communicating with the UE according to the one or more transmit parameters.

Certain aspects of the present disclosure provide a method for wireless communications by a UE. The method generally includes sending, to a BS, an indication of a category of the UE, wherein the category of the UE indicates at least one of: a maximum throughput supported by the UE or a number of layers supported by the UE and receiving one or more transmissions, from the BS, transmitted according to one or more transmit parameters determined based on an assumption by the BS of a number of receivers at the UE.

Certain aspects of the present disclosure provide an apparatus for wireless communications such as a BS. The apparatus generally includes means for receiving, from a UE, an indication of a category of the UE, wherein the category of the UE indicates at least one of: a maximum throughput supported by the UE or a number of layers supported by the UE, means for assuming a number of receivers at the UE based on the category of the UE, means for determining one or more transmit parameters based on the number of receivers of the UE, and means for communicating with the UE according to the one or more transmit parameters.

Certain aspects of the present disclosure provide an apparatus for wireless communications such as a UE. The apparatus generally includes means for sending, to a BS, an indication of a category of the UE, wherein the category of the UE indicates at least one of: a maximum throughput supported by the UE or a number of layers supported by the UE and means for receiving one or more transmissions, from the BS, transmitted according to one or more transmit parameters determined based on an assumption by the BS of a number of receivers at the UE.

Certain aspects of the present disclosure provide an apparatus for wireless communications such as a BS. The apparatus generally includes at least one processor configured to obtain, from a UE, an indication of a category of the UE, wherein the category of the UE indicates at least one of: a maximum throughput supported by the UE or a number of layers supported by the UE, assume a number of receivers at the UE based on the category of the UE, determine one or more transmit parameters based on the number of receivers of the UE, and communicate with the UE according to the one or more transmit parameters; and a memory coupled with the at least one processor.

Certain aspects of the present disclosure provide an apparatus for wireless communications such as a UE. The apparatus generally includes at least one processor configured to output for transmission, to a BS, an indication of a category of the UE, wherein the category of the UE indicates at least one of: a maximum throughput supported by the UE or a number of layers supported by the UE and obtain one or more transmissions, from the BS, transmitted according to one or more transmit parameters determined based on an assumption by the BS of a number of receivers at the UE.

Certain aspects of the present disclosure provide a computer readable medium having computer executable code stored thereon. The code generally includes code for receiving, from a UE, an indication of a category of the UE, wherein the category of the UE indicates at least one of: a maximum throughput supported by the UE or a number of layers supported by the UE, code for assuming a number of receivers at the UE based on the category of the UE, code for determining one or more transmit parameters based on the number of receivers of the UE, and code for communicating with the UE according to the one or more transmit parameters.

Certain aspects of the present disclosure provide a computer readable medium having computer executable code stored thereon. The code generally includes code for sending, to a BS, an indication of a category of the UE, wherein the category of the UE indicates at least one of: a maximum throughput supported by the UE or a number of layers supported by the UE and code for receiving one or more transmissions, from the BS, transmitted according to one or more transmit parameters determined based on an assumption by the BS of a number of receivers at the UE.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
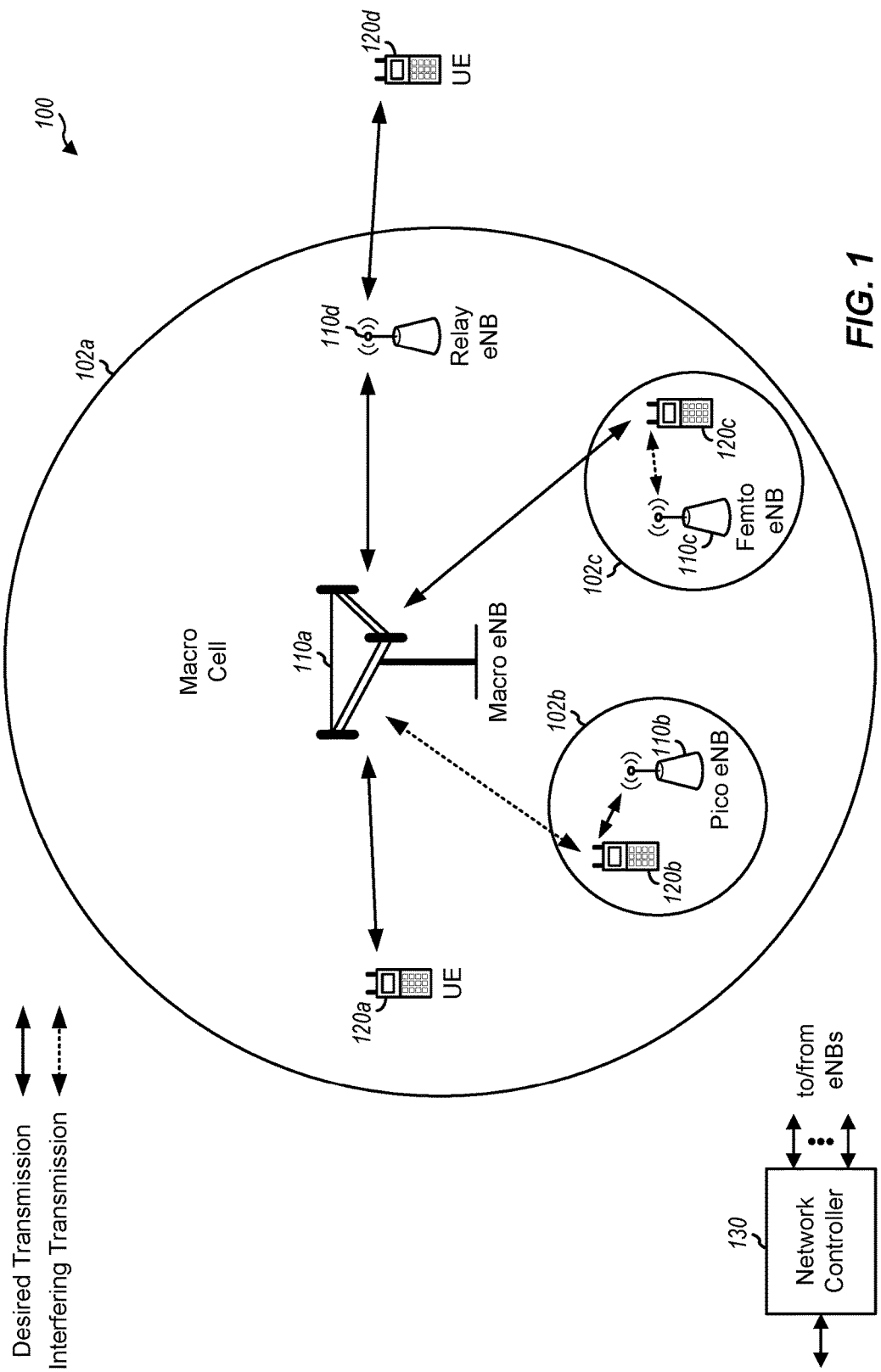
FIG. 1 is a block diagram conceptually illustrating an example of a wireless communication network, in accordance with certain aspects of the present disclosure.

Aspects of the present disclosure provide techniques that may help enable efficient communication between a base station and certain devices, such as machine type communication (MTC) user equipments (UEs) and/or a wearable device or UE, having a single receiver (RX) for long term evolution (LTE). For example, a base station (BS) may receive an indication of UE-Category from a UE and assume a number of number of receivers at the UE based on the UE-Category indicated. The BS may then determine transmit parameters based on the number of receivers at the UE and communicate with the UE according to the determined transmit parameters.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Example Wireless Communications System

FIG. 1 illustrates an example wireless communication network 100, in which aspects of the present disclosure may be practiced. For example, techniques presented herein may be used to help user equipments (UEs) and base stations (BSs) shown in FIG. 1 communicate. For example, a eNB 110 may receive an indication of UE-Category from a UE 120 and assume a number of number of receivers at the UE 120 based on the UE-Category indicated. The eNB 110 may then determine transmit parameters based on the number of receivers at the UE 120 to use for communicating with the UE 120.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In aspects, the UE may include an MTC device or a wearable device. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
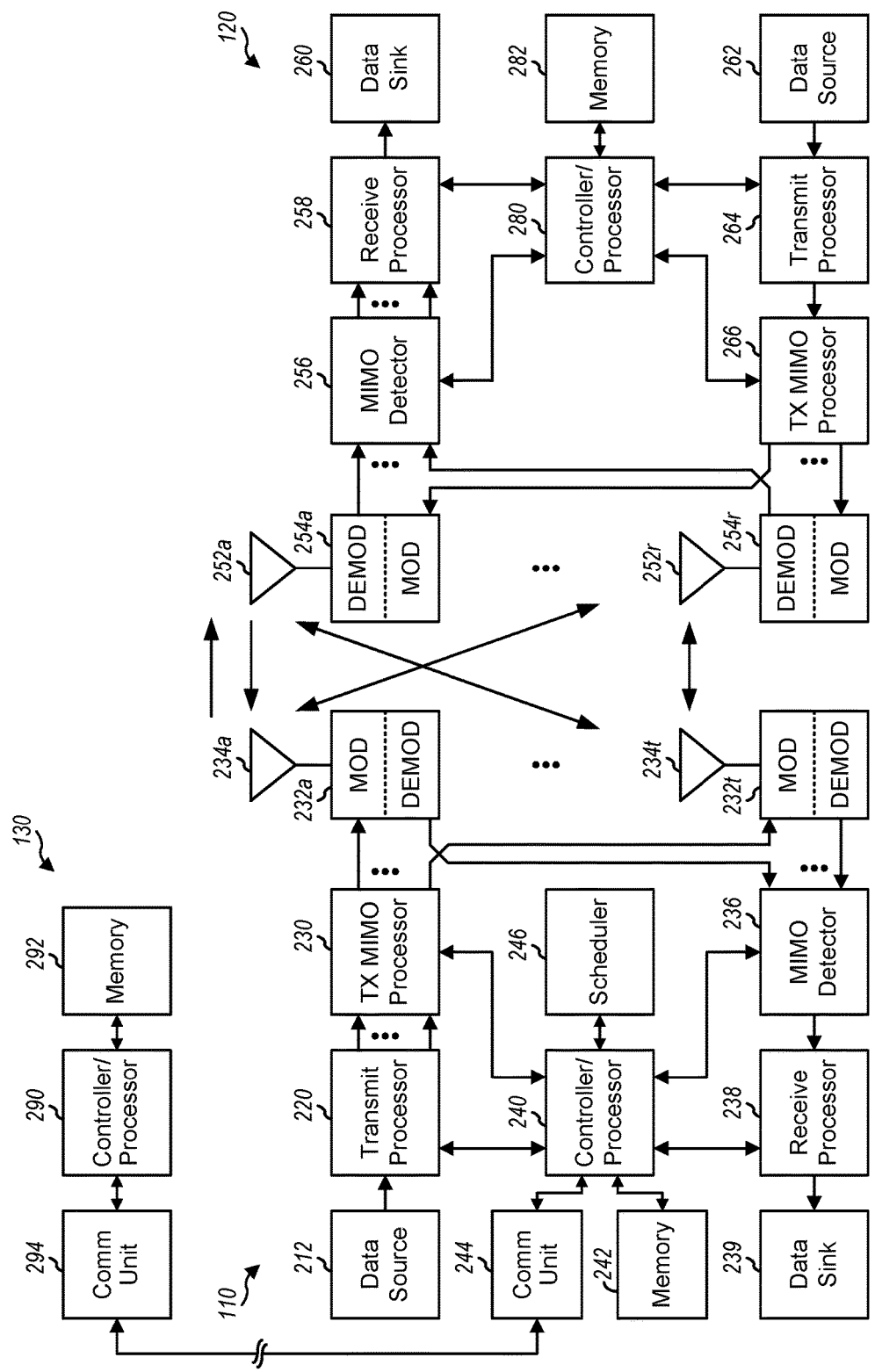
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs shown in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, controller/processor 240 and/or other processors and modules at base station 110 may perform direct operations 500 shown in FIG. 5. Similarly, controller/processor 280 and/or other processors and modules at UE 120, may perform or direct operations 600 shown in FIG. 6. Memories 242 and 282 may store data and program codes for base station 110 and UE 120, respectively. A scheduler 246 may schedule UEs for data transmission on the downlink and/or uplink. In some aspects, one or more of the components shown in FIG. 2 may be employed to perform example processes 500, 600 and/or other processes for the techniques described herein.

Figure 3:
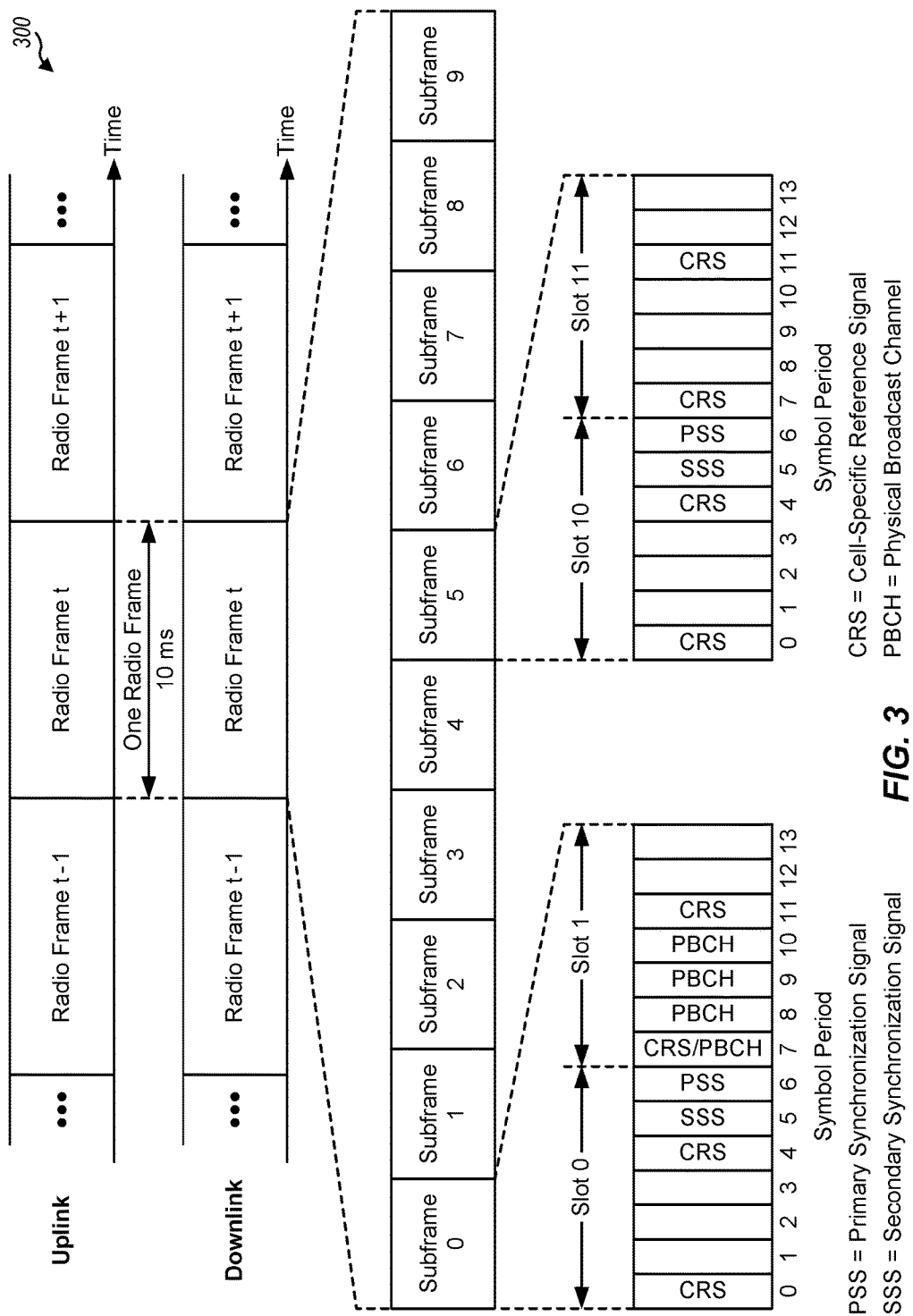
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames (e.g., as shown in FIG. 3, radio frames t−1, t, t−1, . . . ). Each radio frame may have a predetermined duration (e.g., 10 milliseconds (ms)) and may be partitioned into 10 subframes with indices of 0 through 9 (e.g., as shown in FIG. 3, radio frame t is partitioned into subframe 0 through subframe 10). Each subframe may include two slots. Each radio frame may thus include 20 slots with indices of 0 through 19 (e.g., as shown in FIG. 3, subframe 0 includes slot 0 and slot 1 and subframe 5 includes slot 10 and slot 11). Each slot may include L symbol periods, for example, seven symbol periods for a normal cyclic prefix (as shown in FIG. 3) or six symbol periods for an extended cyclic prefix. The 2L symbol periods in each subframe may be assigned indices of 0 through 2L−1 (e.g., as shown in FIG. 3, slot 0 includes symbols 0-6, slot 1 includes symbols 7-13, slot 10 includes symbols 0-6, and slot 11 includes symbols 7-13).

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. In aspects, one or more of the above-described signals and/or channels may be transmitted in a different time and/or frequency resource.

Figure 4:
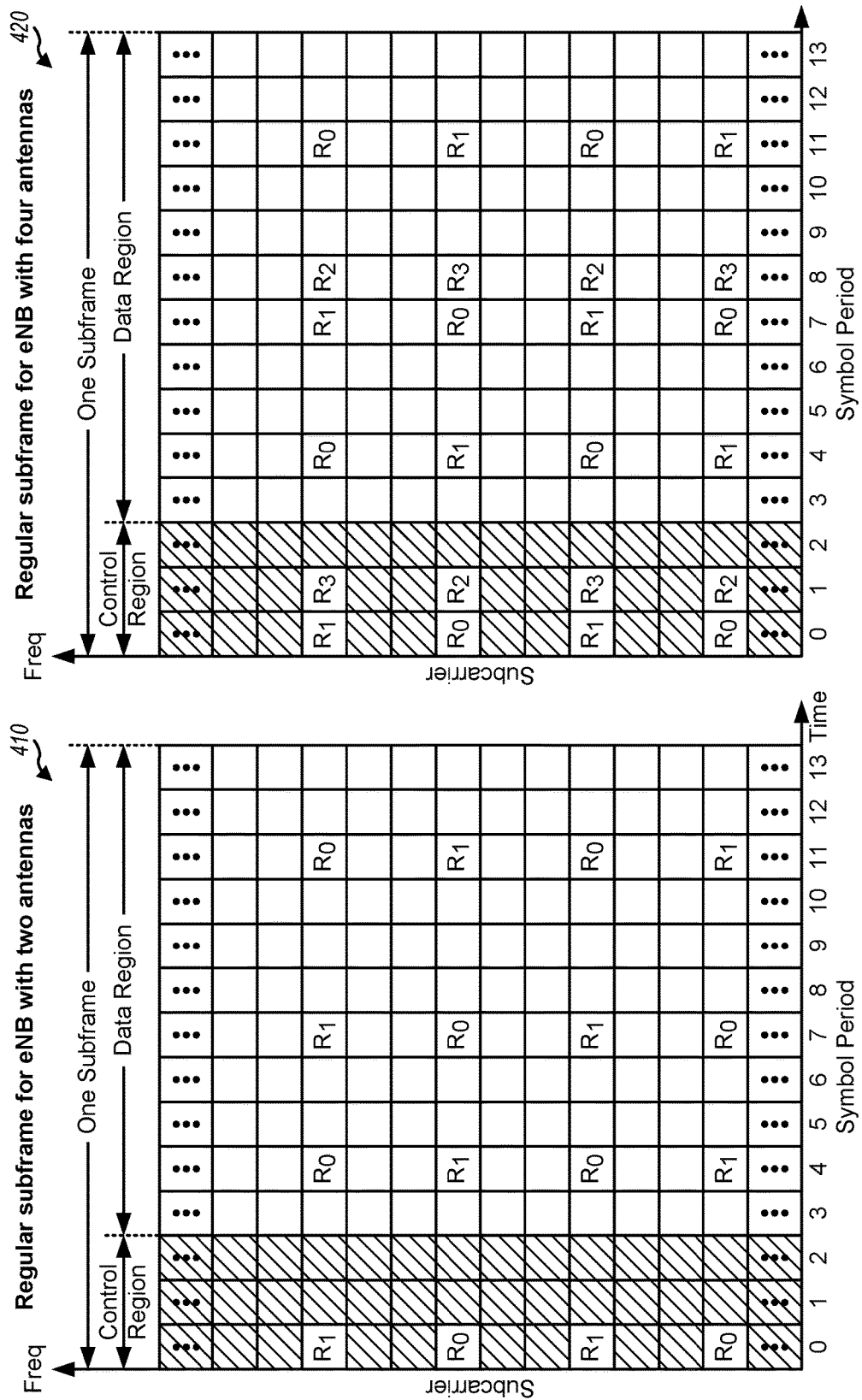
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 4A:
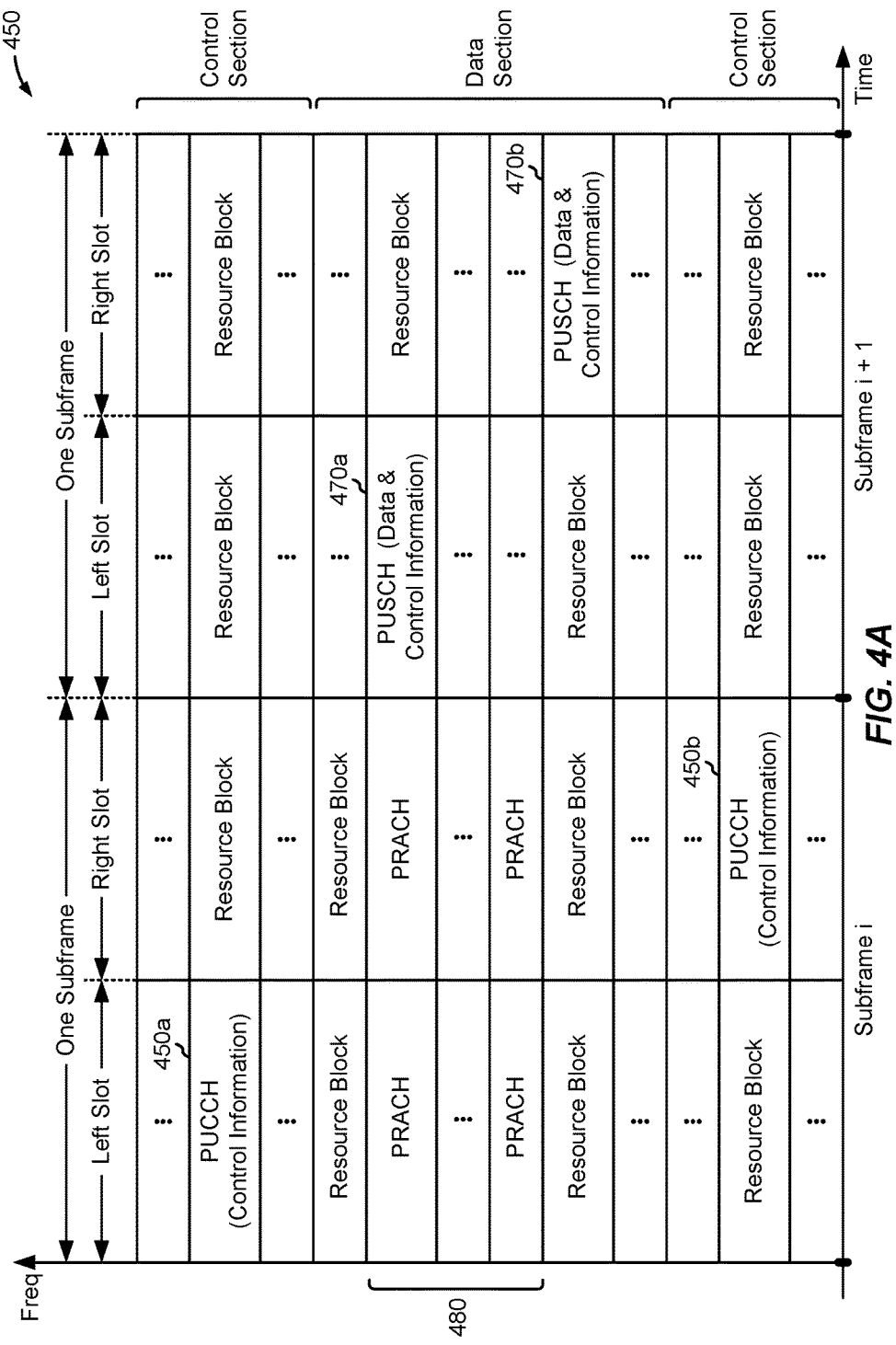
FIG. 4A is a diagram illustrating an example of an uplink (UL) frame structure in LTE, in accordance with certain aspects of the present disclosure.

FIG. 4A is a diagram illustrating an example of an uplink (UL) frame structure 450 in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 450a, 450b in the control section to transmit control information to an eNB. The UE may also be assigned resource blocks 470a, 470b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 480. The PRACH 480 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms). In aspects, one or more of the above-described signals and/or channels may be transmitted in a different time and/or frequency resource.

As indicated above, FIGS. 4 and 4A are provided as examples. Other examples are possible and may differ from what was described above in connection with FIGS. 4 and 4A.

Example Link Budget Enhancements for Single Receiver Devices

In certain wireless networks (e.g., long term evolution (LTE)), UE-Category information may be used to allow the base station (e.g., such as eNB 110) to communicate effectively with the UEs (e.g., such as a UE 120) connected to it by defining the performance levels supported by the UE 120. For example, the UE-Category defines a combined uplink and downlink capability of the UE. The capabilities associated with the UE-Category may be as defined in the wireless standards (e.g., as specified in 3GPP TS 36.306). As the UE-Category defines the overall performance and capabilities of the UE 120, the eNB 110 can communicate using parameters that are determined according to capabilities that the eNB 110 knows the UE 120 possesses based on the UE-Category of the UE 120. For example, the eNB 110 may communicate using parameters that do not exceed the performance capabilities of the UE 120.

Since machine type communications (MTC) devices (e.g., MTC UEs) and wearables (e.g., wireless devices that may be worn, for example, by the user) may transmit infrequently, UE-Category 1 (CAT1) and single receiver (e.g., where the device has only a single receive chain) may be a common choice for MTC devices and/or wearables. Single RX may also allow these devices to have a smaller form factor, for example, which may be desirable for wearables and MTC devices. CAT1 UEs may support a single layer (e.g., rank 1)

and, accordingly, do not support multiple-input multiple-out (MIMO) communications. CAT1 UEs may be limited to a particular peak downlink and uplink throughput (e.g., lower peak throughputs than UEs having a higher UE-Category). Single receiver (1RX) devices have only a single receive chain and, therefore, lack diversity which may have significant impact on the DL link budget. For example, there may be up to 4 dB loss across search/mobility performance, control channel performance, and/or signalling and voice data performance.

Accordingly, techniques and apparatus for enhancing link budgets (e.g., in LTE) for single receiver devices are desired.

Aspects of the present disclosure provide techniques for a UE to indicate a category of the UE and/or a number of supported receivers at the UE to the base station. The BS may then determine transmit parameters based on the UE-Category and the number of receivers at the UE (e.g., assumed by the BS based on the indicated capability). For example, aspects of the present disclosure provide techniques for enhanced signaling procedures that may be used for communications with single receiver devices, for example, in LTE.

Figure 5:
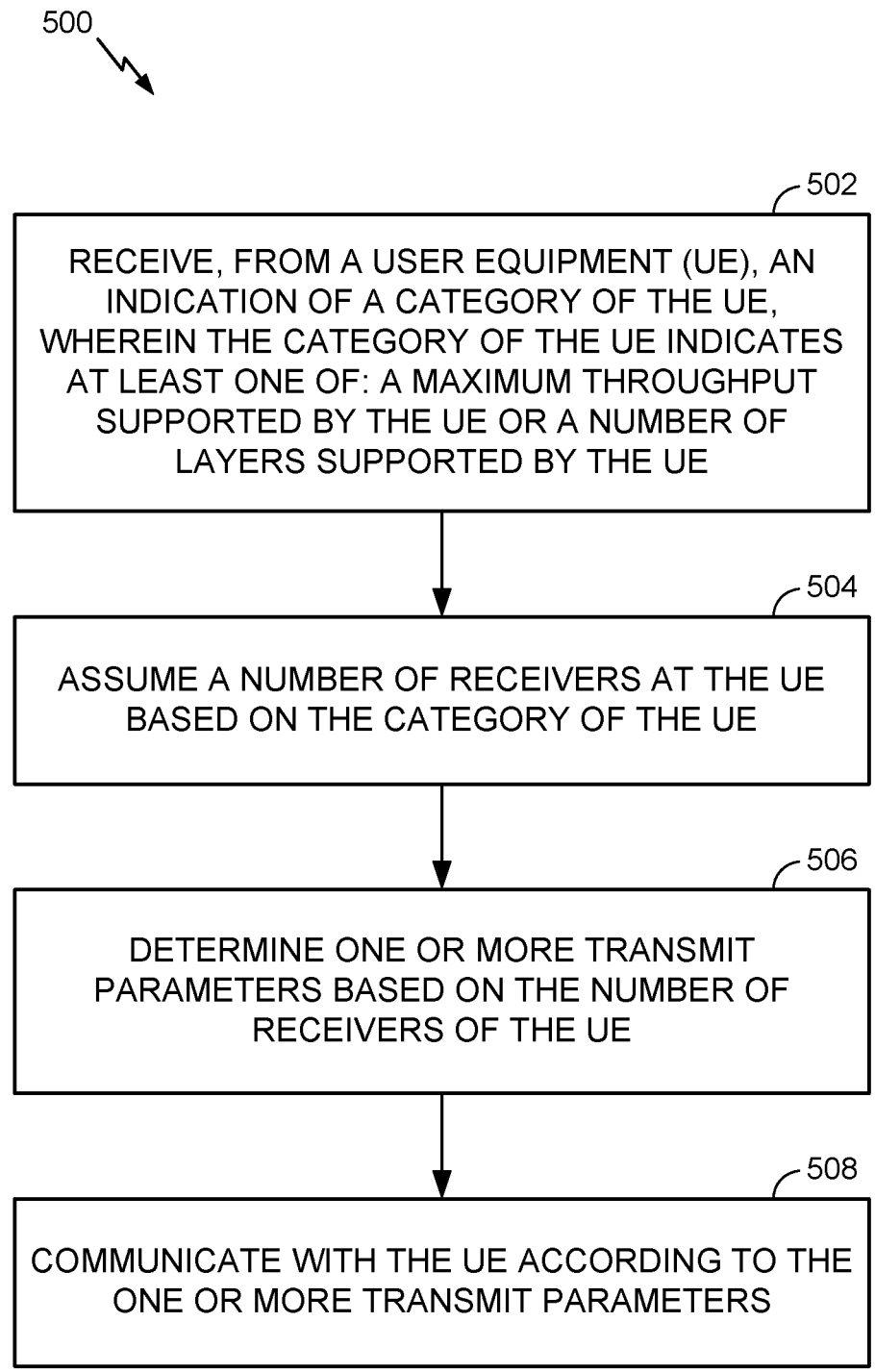
FIG. 5 is a flow diagram illustrating example operations for wireless communications by a base station (BS), in accordance with certain aspects of the present disclosure.

FIG. 5 is a flow diagram of example operations 500 for wireless communications, in accordance with certain aspects of the present disclosure. The operations 500 may be performed, for example, by a BS (e.g., eNB 110). The operations 500 may begin, at 502, by receiving, from a UE (e.g., UE 120), an indication of a category of the UE 120, wherein the category of the UE 120 indicates at least one of: a maximum throughput supported by the UE 120 or a number of layers supported by the UE 120.

At 504, the eNB 110 assumes a number of receivers at the UE 120 based on the category of the UE 120.

At 506, the eNB 110 determines one or more transmit parameters based on the number of receivers of the UE 120.

At 508, the eNB 110 communicates with the UE 120 according to the one or more transmit parameters.

Figure 6:
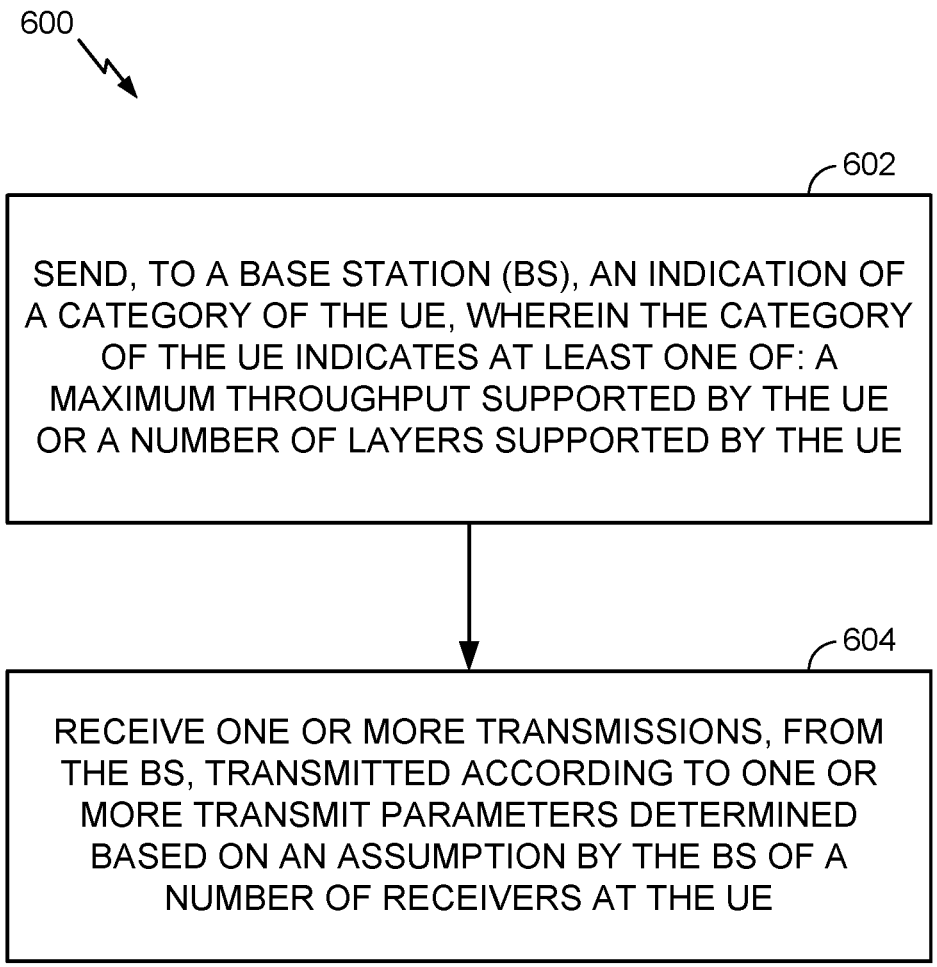
FIG. 6 is a flow diagram illustrating example operations for wireless communications by a UE, in accordance with certain aspects of the present disclosure.

FIG. 6 is a flow diagram of example operations 600 for wireless communications, in accordance with certain aspects of the present disclosure. The operations 600 may be performed, for example, by a UE (e.g., UE 120). The operations 600 may be complementary operations performed by the UE 120 to the operations 600 performed by the eNB 110. The operations 600 may begin, at 602, by sending, to a BS (e.g., eNB 110), an indication of a category of the UE, wherein the category of the UE 120 indicates at least one of: a maximum throughput supported by the UE or a number of layers supported by the UE 120.

At 604, the UE 120 receives one or more transmissions, from the BS, transmitted according to one or more transmit parameters determined based on an assumption by the BS of a number of receivers at the UE 120.

Example UE-eNB Handshake

An indication of CAT0 by the UE may indicate to the eNB that the UE is a single RX UE. However, certain UEs (e.g., UEs that operate according to Release-11 or earlier of the wireless LTE standards) may not support CAT0. A declaration of CAT1 by the UE indicates that the UE supports rank-1; however, a UE can support more receive chains than the supported layers. For example, although the UE may declare CAT1, the UE can have more than a single receive chain. Thus, when the eNB receives the indication of CAT1 from the UE, the eNB may not know whether the UE has a single receive chain or multiple receive chains. Thus, it may be desirable for the UE to indicate to the eNB the number of receivers at the UE (e.g., signal information based on which the eNB may assume the number of UE receivers), in addition to an indication of the UE-Category.

In one example implementation, the eNB 110 can infer the number of receivers at the UE 120 based on the indication of the UE-Category (e.g., received in an uplink message from the UE 120). For example, it may be given that the UE CAT1 categorization is paired with the 1RX configuration and, thus, the eNB 110 may infer (e.g., assume) the number of receivers at the UE 120 to be one (e.g., 1RX UE) if the UE 120 reports (e.g., indicates) CAT1 to the eNB 110. However, as mentioned above, in some cases, a CAT1 UE 120 may have multiple receive chains (e.g., may not be a 1RX UE).

According to certain aspects, the UE 120 may reuse some existing reserved bits in a radio resource control (RRC) message to declare to the eNB 110 that the UE 120 has a single receiver.

According to certain aspects, the UE 120 may use signaling (e.g., overloading) according to a parameter that is not specifying the UE-Category of the UE 120 to indicate the number of receivers at the UE 120 to the eNB 110.

Channel state feedback (CSF) is transmitted by the UE once the UE attached to the network. The UE may send CSF to inform the eNB about signal-to-noise ratio (SNR), precoding matrix indicator (PMI), rank supported, channel quality indicator (CQI), etc. In another example implementation, the UE 120 may use CSF to inform the BS 110 of the number of receive chains at the UE 120. Since a CAT1 UE 120 can only support rank-1 transmissions, a rank-2 CSF report by the CAT1 UE 120 may be used as a signaling mechanism between the eNB 110 and UE 120 to indicate the number of receivers at the UE 120. For example, if the CAT1 UE 120 sends a rank-2 CSF report to the eNB 110 to indicate to the eNB 110 that the UE has a single receive chain (e.g., that the UE is a single RX UE).

In yet another example implementation, the eNB 110 may identify the CAT1 UE 120 as a single receiver UE based on the UE identification (UE ID).

In yet another example implementation, the eNB 110 may identify the CAT1 UE 120 as a single receiver UE based on a particular value (e.g., overloading) of a UE capability signaling for a feature that is not applicable to CAT1 UEs. One example of such overloading of a feature is signaling 256 QAM associated with CAT1 capability is, 256 QAM is a feature that is not applicable to a CAT1 UE, therefore, the UE 120 may signal support for 256 QAM capability to the eNB 110 implying that the UE is a single RX UE.

In yet another example implementation, the eNB 110 may identify the CAT1 UE 120 as a single receiver UE based on a particular CQI value. For example, the UE 120 may indicate CQI 0 for downlink which may be mapped to fixed spectral efficiency (SPEF) (e.g., 3 dB below the lowest defined SPEF) based on a CQI-SPEF mapping.

According to certain aspects, the UE 120 may send the indication that the UE is a 1RX UE when the UE is experiencing poor channel conditions.

According to certain aspects, although the discussion herein is focused on CAT1, the techniques discussed herein may be used for other UE-Categories as well, for example, UE-Categories greater than one which may support more than a single layer.

According to certain aspects, the eNB 110 may respond to the indication from the UE 120 by sending a grant with a particular transmission mode (TM) and/or a particular rank. For example, the eNB 110 may provide only TM3 rank-1 grants using a new CQI-SPEF mapping. The eNB 110 may acknowledge the indication from the UE 120 by sending rank-2 grants with a single layer. The acknowledgment may indicate to the UE that the eNB will use the enhanced (e.g., adjusted or optimized) signaling procedures described below, which may allow the UE to transmit enhanced signaling and/or to look/monitor for enhanced signaling from the eNB. According to certain aspects, in downlink control information (DCI) formats 2, 2A, 2B, 2C, and 2D, a transport block may be disabled in MCS=0 and RVidx=1, otherwise a transport block is enabled.

According to certain aspects, the signaling between the UE 120 and eNB 110 may define a handshaking exchange for indicating the number of receivers at the UE 120 to the eNB 110 and initiating adjusted signaling procedures.

Example Signaling Enhancements for Single RX UEs

According to certain aspects, once the eNB 110 is aware that the CAT1 UE 120 is a single RX UE, for example, by the handshaking procedure described above, the eNB 110 may determine and/or adjust transmit parameters to use for communicating with the UE. For example, the eNB 110 may use enhanced (e.g., optimized) signaling for communicating with the single RX CAT1 UE 120. In aspects, the enhanced signaling may be in an effort to increase the link budget for the single RX UE. The enhanced signaling may compensate for reduced or no spatial diversity (i.e., due to the fact that the UE is single RX) by using time and/or frequency diversity, power boosting, and/or by lowering spectral efficiency (SPEF).

According to certain aspects, the UE 120 may selectively choose when to send the indication to the eNB 110 (e.g., to trigger the adjusted signaling) in order to conserve power. For example, the UE 120 may send the indication when the channel conditions are poor.

Example Adjusted CQI-SPEF Mapping

According to certain aspects, a lower spectral efficiency for channel quality indicator (CQI) reporting may be enabled. In an example implementation, the CQI-SPEF mapping may be offset. For example, the eNB 110 may map or remap the CQI-SPEF (e.g., a table stored at the eNB 110), such that a reported CQI value from the UE 120 corresponds (e.g., is mapped to) to a lower SPEF value. In aspects, the eNB 110 may use the new CQI-SPEF mapping to select a modulation and coding scheme (MCS) to use for communications with the UE 120. The lower SPEF value mapping may lead to a larger transport block size and, accordingly, a higher throughput for the communications with the UE 120.

Example Adjusted PSS/SSS Transmissions

Primary synchronization signals (PSS) and secondary synchronization signals (SSS) (e.g., typically transmitted by the eNB every 5 ms) are decoded by the UE 120 to synchronize with the eNB 110. According to certain aspects, upon receiving an indication of the number of supported receivers at the UE and/or receiving other information, based on which the eNB 110 assumes (e.g., determines) the number of UE 120 receivers, the eNB 110 may adjust signaling for PSS and/or SSS, for example, as part of the enhanced signaling procedure for single RX UEs.

In an example implementation, search performance may be improved by adding additional SSS/PSS opportunities (e.g., as used herein, additional repetitions, may refer to repetitions beyond a number of repetitions that may be defined in the wireless standards). For example, instead of transmitting PSS/SSS every 5 ms (e.g., every subframe), the PSS/SSS may be transmitted every 1 ms (e.g., in every subframe). The repetition pattern in the time domain may be different across neighboring cells (e.g., the pattern from the eNB 110 may be unique). According to certain aspects, the UE 120 may be aware of the enhanced signaling procedures (e.g., based on receiving the handshaking acknowledgment from the eNB 110). For example, the UE 120 may begin looking for (e.g., monitoring) the PSS/SSS repetitions. In the example of PSS/SSS every 1 ms, the UE 120 may begin looking for the PSS/SSS in each subframe.

Additionally or alternatively, PSS and/or SSS may be power boosted (e.g., transmitted at a higher power level than the power level at which the PSS/SSS is typically transmitted) which may effective improve the UE geometry. Optionally, power boosting may be limited only the new instances of PSS/SSS; in other words, the eNB 110 may apply power boosting only for the added PSS/SSS repetitions (e.g., PSS/SSS opportunities). This may allow the signaling to be backward compatible with older types of UEs. According to certain aspects, the PSS and/or SSS repetitions may be transmitted in symbols that do not carry cell-specific reference signals (CRS).

Additionally or alternatively, for frequency division duplexing (FDD) systems, the eNB 110 may send the UE 120 a synchronization indication to allow for shortened searches for the UE 120 (e.g., early termination for successful searches).

According to certain aspects, the techniques described above for power boosting and repetitions may be applied to any of the techniques described below for the other channels.

Example Adjusted PBCH Transmissions

Physical broadcast channel (PBCH) (e.g., typically transmitted every 40 ms with RV repetitions of 10 ms by the eNB) may include a master information block (MIB) with information about the system (e.g., number of transmit antennas, subframe number, etc.) and may be decoded by the UE before the UE attaches to the network.

According to certain aspects, upon receiving an indication of the number of supported receivers at the 120 and/or receiving other information, based on which the eNB 110 assumes the number of UE receivers, the eNB 110 may adjust signaling for PBCH, for example, as part of the enhanced signaling procedure for single RX UEs. PBCH performance may be improved by faster (e.g., more frequent) PBCH repetition. In one example, the eNB 110 may transmit the PBCH more frequently (e.g., and the UE may look for/monitor the PBCH) than once every 10 ms. The repetition pattern in the time domain may be different across neighboring cells (e.g., the pattern from the eNB 110 may be unique).

Additionally or alternatively, the PBCH may be power boosted. Optionally, power boosting may be limited only to the new instances of PBCH; in other words, only for the added repetitions.

Example Restriction of Resources for Repetitions

According to certain aspects, upon receiving an indication of the number of supported receivers at the UE and/or receiving other information, based on which the eNB 110 assumes the number of UE receivers, the eNB 110 may adjust signaling by determining particular resources (e.g., frequency and/or time resources) to use for sending the adjusted signaling (e.g., as part of the enhanced signaling procedure for single RX UEs). For example, the scheduler (e.g., eNB 110) may schedule particular frequency resources for transmission. In one example, the center six resource blocks (RBs) are scheduled for sending the adjusting signaling. Additionally or alternatively, the scheduler may schedule particular time resources for transmission. In one example, the scheduler may schedule only subframe #0 and/or subframe #5 for repetitions to avoid multimedia single frequency network (MBSFN) subframes and UE-specific reference signal (UE-RS) transmissions.

Example Adjusted PDCCH Transmissions

Once the UE 120 attaches to the network, the UE 120 may look decode grants in the physical downlink control channel (PDCCH). According to certain aspects, upon receiving an indication of the number of supported receivers at the UE 120 and/or receiving other information, based on which the eNB 110 assumes the number of UE receivers, the eNB 110 may adjust signaling for PDCCH transmissions (e.g., as part of the enhanced signaling procedure for single RX UEs).

In an example implementation, the eNB 110 may transmit PDCCH with power boosting. The power boosted PDCCH transmissions may have increased traffic-to-pilot ratio (TPR). The channel format indicator (CFI) for the PDCCH transmissions may also be increased so that PDCCH capacity is increased for use of higher aggregation levels. For example, the number of symbols used for PDCCH transmission in the subframe may be increased.

Additionally or alternatively, PDCCH may be transmitted at an increased aggregation level (e.g., AGG16 and above) in order to reduce the SPEF (e.g., by causing transmission of more parity bits).

Additionally or alternatively, PDCCH repetitions may be transmitted in the frequency and/or time domain.

Example Adjusted PHICH Transmissions

According to certain aspects, upon receiving an indication of the number of supported receivers at the UE 120 and/or receiving other information, based on which the eNB 110 assumes the number of UE receivers, the eNB 110 may adjust signaling for physical hybrid automatic repeat request (HARQ) indicator channel (PHICH) transmissions (e.g., as part of the enhanced signaling procedures for single RX UEs).

In an example implementation, the PHICH may be power boosted to increase the TPR.

Additionally or alternatively, the PHICH transmissions may be repeated.

Example Adjusted SIB Transmissions

The system information blocks (SIB) include information related reselection parameters, attachment, etc. According to certain aspects, upon receiving an indication of the number of supported receivers at the UE 120 and/or receiving other information, based on which the eNB 110 assumes the number of UE receivers, the eNB 110 may adjust signaling for SIB transmissions (e.g., as part of the enhanced signaling procedures for single RX UEs).

In one example implementation, the SIB transmissions may be power boosted to increase the TPR.

Additionally or alternatively, the SIB transmissions may be repeated.

Additionally or alternatively, the fixed grant size may include additional RBs in order to reduce SPEF.

Example Adjusted Paging Occasion Transmissions

According to certain aspects, upon receiving an indication of the number of supported receivers at the UE 120 and/or receiving other information, based on which the eNB 110 assumes the number of UE receivers, the eNB 110 may adjust signaling for paging transmissions (e.g., as part of the enhanced signaling procedures for single RX UEs).

In one example implementation, the paging may be power boosted to increase the TPR.

Additionally or alternatively, the paging occasions (PO) may be repeated across other POs or across a discontinuous reception (DRX) cycle.

Additionally or alternatively, the fixed grant size may include additional RBs in order to reduce code rate.

Example Adjusted PDSCH Transmissions

According to certain aspects, upon receiving an indication of the number of supported receivers at the UE 120 and/or receiving other information, based on which the eNB 110 assumes the number of UE receivers, the eNB 110 may adjust signaling for physical downlink shared channel (PDSCH) (e.g., data) transmissions (e.g., as part of the enhanced signaling procedures for single RX UEs).

In one example implementation, the transmission time interval (TTI) bundling in the time domain (e.g., subframe bundling) may be used. In this case, the same packet may be transmitted (e.g., repeated) in multiple subframes. Repetitions may be increased with higher number of HARQ transmissions for PDSCH (e.g., a higher HARQ number may be used).

Additionally or alternatively, a higher number of transmission ports (e.g., antennas) may be used for PDSCH (e.g., for UE-RS) to allow for transmit diversity.

Additionally or alternatively, the MCS table may be remapped, for example, a lower SPEF may enabled by remapping the transport block size (TBS) for given values of a {RB, MCS} pair. According to certain aspects, the eNB may reuse a particular MCS (e.g., MCS29 or greater) to indicate a grant tailored to a 1RX UE.

Additionally or alternatively, TPR for PDSCH may boosted (e.g., PDSCH may be power boosted). According to certain aspects, TRP estimation may be enabled for quadrature phase shift keying (QPSK). Alternatively, the eNB 110 may tell the UE 120 which TPR to assume for QPSK while operating in a mode with the adjusted transmissions. As yet another example, $P_A/P_B$ values may be remapped for 16/64 QAM (e.g., with a positive bias).

According to certain aspects, the eNB 110 and UE 120 may use any combination of the techniques described above. For example, the enhanced signaling may be used for only the PDSCH, or may be used for all of the channels.

According to certain aspects, similar techniques may be used for uplink link budget enhancements. For example, repetition may be used for physical uplink control channel (PUCCH), sounding reference signal (SRS), demodulation reference signal (DM-RS) (e.g., within a TTI), random access channel (RACH) (e.g., may be repeated twice in a row), and/or rank-1 acknowledgment bits on both QPSK dimensions used for rank 2.

Figure 7:
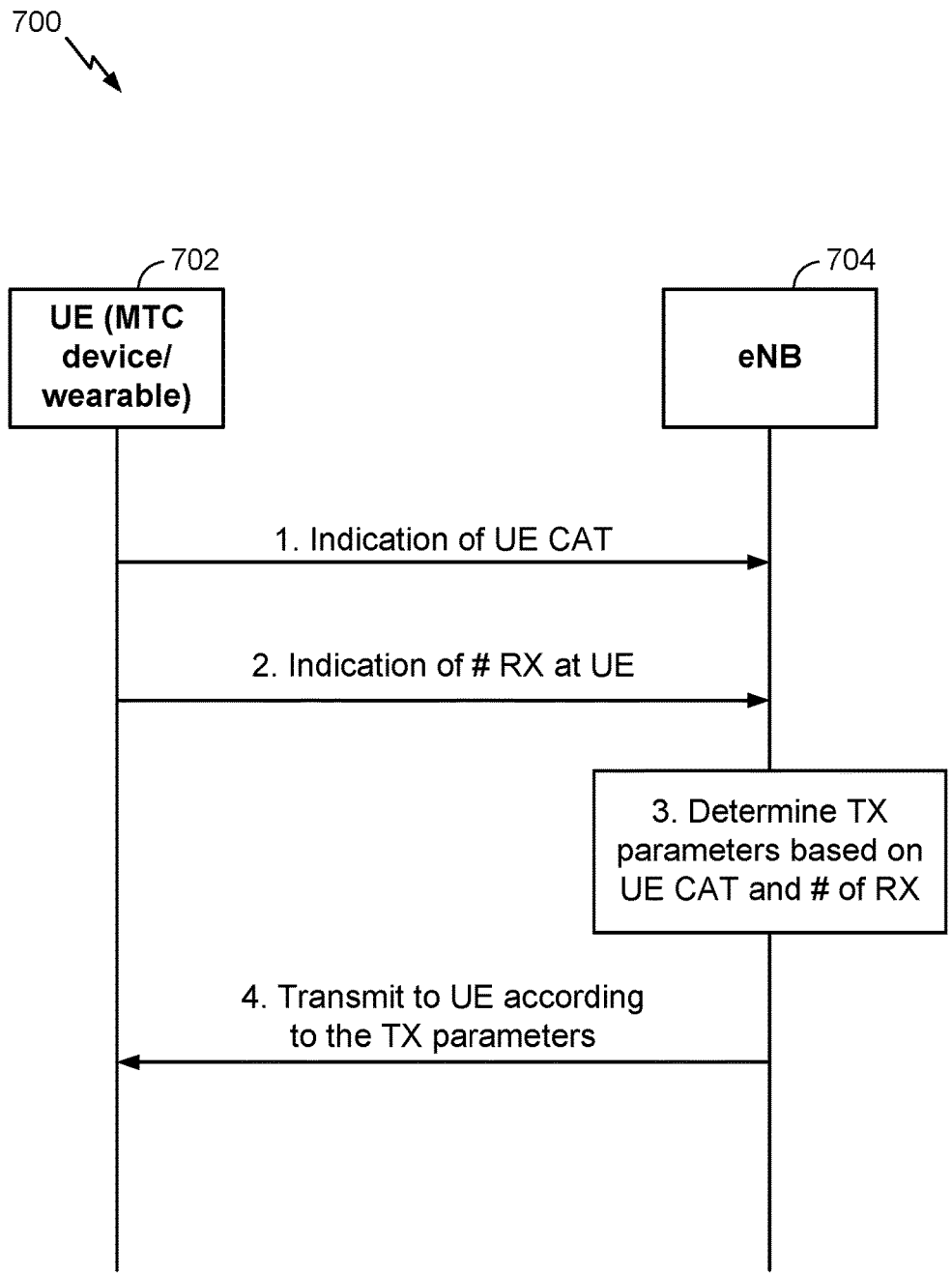
FIG. 7 is an example call flow illustrating example operations for setting communication parameters based on an indicated UE category and number of receivers at the UE, in accordance with certain aspects of the present disclosure.

FIG. 7 is an example call flow illustrating example operations 700 for setting communication parameters based on an indicated UE category and number of receivers at the UE, in accordance with certain aspects of the present disclosure. As shown in FIG. 7, at 1, the UE 702 (e.g., which may be an MTC device or wearable) may send an indication of the UE-Category (e.g., CAT1) to the eNB 702. At 2, the UE 702 sends an indication of the number of receivers (e.g., 1RX) at the UE (e.g., or information or signaling based on which the eNB 704 determines or assumes the number of receivers). At 3, the eNB 704 determines transmit parameters based on the UE-Category and number of receivers and, at 4, the eNB 704 transmits to the UE according to the determined transmit parameters.

According to certain aspects, the techniques provided herein may mitigate link budget loss due to lack of diversity chains. According to certain aspects, any combination of the above techniques may be used. For example, in some cases, they may only be used for the PDSCH enhancements, in other cases, they may be used for all of the channels discussed.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for means for receiving, from a user equipment (UE), an indication of a category of the UE, wherein the category of the UE indicates at least one of: a maximum throughput supported by the UE or a number of layers supported by the UE may be a receiver of the eNB, for example, which may include antenna(s) 234a-234t, demodulator(s) 232a-232t, MIMO Detector 236, and/or Receive Processor 238 of the base station 110 illustrated in FIG. 2. Means for assuming a number of receivers at the UE based on the category of the UE and means for determining one or more transmit parameters based on the number of receivers of the UE may be a processing system of the eNB, for example, which may include Controller/Processor 240 and/or Schedule 246 of the base station 110 illustrated in FIG. 2. Means for communicating with the UE according to the one or more transmit parameters may be a transmitter of the eNB, for example, which may include the antenna(s) 234a-234t, Modulator(s) 232t-232t, TX MIMO Processor 230, and/or Transmit Processor 220 of the base station 110 illustrated in FIG. 2.

Means for sending, to a base station (BS), an indication of a category of the UE, wherein the category of the UE indicates at least one of: a maximum throughput supported by the UE or a number of layers supported by the UE may be a transmitter of the UE, for example, which may include antenna(s) 252a-252r, modulator(s) 254a-254r, TX MIMO Processor 266, and/or Transmit Processor 264 of the UE 120 illustrated in FIG. 2. Means for receiving one or more transmissions, from the BS, transmitted according to one or more transmit parameters determined based on an assumption by the BS of a number of receivers at the UE may be receiver of the UE, for example, which may include antenna(s) 252a-252r, Demodulator 254a-252r, MIMO Detector 256, and/or Receive Processor 258 of the UE 120 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a base station (BS), comprising:
  receiving an indication of a category of a user equipment (UE), wherein the category of the UE indicates capabilities of the UE including at least one of: a first rank, a first modulation and coding scheme (MCS), a first channel quality indicator (CQI) value, a first maximum throughput supported by the UE or a first number of layers supported by the UE;
  receiving a user equipment (UE) identification (UE ID) or a channel state feedback (CSF) from the UE, wherein the CSF includes at least one of: a second rank, a second MCS, or a second CQI value, and wherein at least one of the second rank is different than the first rank, the second MCS is different than the first MCS, or the second CQI value is different than the first CQI value;
  determining, based on the UE ID or the CSF, that the UE communicates using a single receiver;
  determining one or more transmit parameters based on the determination; and
  communicating with the UE according to the one or more transmit parameters.

2. The method of claim 1, wherein:
  the CSF indicates a second number of layers supported by the UE, the second number of layers being different than the first number of layers.

3. The method of claim 1, wherein determining the one or more transmit parameters comprises:
  adjusting a mapping of a channel quality indicator (CQI) to a spectral efficiency.

4. The method of claim 3, further comprising:
indicating to the UE that the BS communicates with the determined one or more transmit parameters by sending a grant of a rank or by using a transmission mode, according to the adjusted mapping.

5. The method of claim 1, wherein determining the one or more transmit parameters is further based on a type of a transmission.

6. The method of claim 5, wherein the type of the transmission comprises at least one of: a secondary synchronization signal (SSS), a primary synchronization signal (PSS), a physical broadcast channel (PBCH), a physical downlink control channel (PDCCH), a physical HARQ indicator channel (PHICH), a system information block (SIB), a paging signal, or a physical downlink shared channel (PDSCH).

7. The method of claim 5, wherein determining the one or more transmit parameters comprises determining a number of times to repeat the transmission.

8. The method of claim 7, wherein determining the number of times to repeat the transmission comprises determining to repeat the transmission more frequently based on the determination that the UE communicates using a single receiver relative to if the number of receivers at the UE were greater than 1.

9. The method of claim 7, wherein determining the one or more transmit parameters further comprises determining resource blocks on which to repeat the transmission.

10. The method of claim 7, wherein determining the one or more transmit parameters further comprises determining one or more subframes on which to repeat the transmission.

11. The method of claim 7, further comprising:
determining a pattern for repeated transmissions unique to the BS, and
transmitting according to the determined pattern.

12. The method of claim 7, further comprising determining whether to repeat the transmission in at least one of: a frequency domain or a time domain.

13. The method of claim 5, wherein determining the one or more transmit parameters comprises determining a transmit power level to use for the transmission.

14. The method of claim 13, wherein determining the transmit power level to use for the transmission comprises determining to use a higher transmit power level based on the determination that the UE communicates using a single receiver.

15. The method of claim 14, wherein the higher transmit power level is used only for repeated transmissions.

16. The method of claim 5, wherein determining the one or more transmit parameters comprises determining an aggregation level to use for the transmission.

17. The method of claim 1, wherein the indicated category of the UE is CAT1 or greater.

18. A method for wireless communications by a user equipment (UE), comprising:
sending an indication of a category of the UE to a base station (BS), wherein the category of the UE indicates capabilities of the UE including at least one of: a first rank, a first modulation and coding scheme (MCS), a first channel quality indicator (CQI) value, a first maximum throughput supported by the UE or a first number of layers supported by the UE;
sending, to the BS, a UE identification (UE ID) or a channel state feedback (CSF) indicating that the UE communicates using a single receiver, the CSF including at least one of: a second number of layers employed by the UE, a rank indicator indicating a second rank, a second MCS, or a second CQI value; and wherein at least one of the second rank is different than the first rank, the second MCS is different than the first MCS, or the second CQI value is different than the first CQI value; and
receiving one or more transmissions, from the BS, transmitted according to one or more transmit parameters determined based on the indication that the UE communicates using a single receiver.

19. The method of claim 18, further comprising:
assuming the one or more transmit parameters based on the sending the UE ID or the CSF that indicates the UE communicates using a single receiver; and
monitoring for the one or more transmissions according to the assumed one or more transmit parameters.

20. The method of claim 18, further comprising:
receiving signaling, from the BS, acknowledging the UE communicates using a single receiver; and
monitoring for the one or more transmissions according to the one or more transmit parameters based on receiving the acknowledgment from the BS.

21. The method of claim 18, wherein the one or more transmit parameters comprises at least one of: a number of repetitions of the one or more transmissions, a power level of the one or more transmissions, an aggregation level of the one or more transmissions, resources blocks used for the one or more transmissions, or subframes used for the one or more transmissions.

22. An apparatus for wireless communications by a base station (BS), comprising:
means for receiving an indication of a category of a user equipment (UE), wherein the category of the UE indicates capabilities of the UE including at least one of: a first rank, a first modulation and coding scheme (MCS), a first channel quality indicator (CQI) value, a first maximum throughput supported by the UE or a first number of layers supported by the UE;
means for receiving a user equipment (UE) identification (UE ID) or a channel state feedback (CSF) from the UE, wherein the CSF includes at least one of: a second rank, a second MCS, or a second CQI value, and wherein at least one of the second rank is different than the first rank, the second MCS is different than the first MCS, or the second CQI value is different than the first CQI value;
means for determining based on the UE ID or the CSF that the UE communicates using a single receiver;
means for determining one or more transmit parameters based on the determination; and
means for communicating with the UE according to the one or more transmit parameters.

23. An apparatus for wireless communications by a user equipment (UE), comprising:
means for sending an indication of a category of the UE to a base station (BS), wherein the category of the UE indicates capabilities of the UE including at least one of: a first rank, a first modulation and coding scheme (MCS), a first channel quality indicator (CQI) value, a first maximum throughput supported by the UE or a first number of layers supported by the UE;
means for sending, to the BS, a UE identification (UE ID) or a channel state feedback (CSF) indicating that the UE communicates using a single receiver, the CSF including at least one of: a second number of layers employed by the UE, a rank indicator indicating a second rank, a second MCS, or a second CQI value; and wherein at least one of the second rank is different than the first rank, the second MCS is different than the first MCS, or the second CQI value is different than the first CQI value; and means for receiving one or more transmissions, from the BS, transmitted according to one or more transmit parameters determined based on the indication the UE communicates using a single receiver.

\* \* \* \* \*